United States Patent
Chang et al.

(10) Patent No.: US 9,185,448 B2
(45) Date of Patent: Nov. 10, 2015

(54) REMOTE CONTROL METHOD, AND SYSTEM, RECEIVING DEVICE, MOBILE INTERNET DEVICE AND RECORDING MEDIUM FOR IMPLEMENTING THE SAME

(75) Inventors: Kuo-Lung Chang, New Taipei (TW); Chao-Cheng Lin, New Taipei (TW); Hsing-Yung Wang, New Taipei (TW); Meng-Chung Hung, New Taipei (TW); Kuan-Yu Chou, New Taipei (TW); Cheng-Hsiung Chang, New Taipei (TW); Shih-Pin Liu, New Taipei (TW)

(73) Assignee: AWIND Inc., New Taipei (TW)

( * ) Notice: Subject to any disclaimer, the term of this patent is extended or adjusted under 35 U.S.C. 154(b) by 0 days.

(21) Appl. No.: 13/241,959

(22) Filed: Sep. 23, 2011

(65) Prior Publication Data
US 2013/0021526 A1 Jan. 24, 2013

(30) Foreign Application Priority Data
Jul. 19, 2011 (TW) .............................. 100125436 A (51) Int. Cl.
*H04N 5/44* (2011.01)
*H04N 21/422* (2011.01)
*G06F 3/14* (2006.01)

(52) U.S. Cl.
CPC .......... *H04N 21/4222* (2013.01); *G06F 3/1462* (2013.01); *G09G 2370/027* (2013.01); *G09G 2370/16* (2013.01)

(58) Field of Classification Search
CPC ............ H04N 5/4403; H04N 5/44582; H04N 21/4222; G09G 2370/16
USPC .................. 348/734, 552, 14.05, 14.02, 114; 715/740; 709/227, 228, 229
See application file for complete search history.

(56) References Cited

U.S. PATENT DOCUMENTS

2010/0138748 A1* 6/2010 Sankararao et al. .......... 715/733
2012/0092277 A1* 4/2012 Momchilov .................. 345/173

* cited by examiner

*Primary Examiner* — Jefferey Harold
*Assistant Examiner* — Jean W Desir
(74) *Attorney, Agent, or Firm* — Muncy, Geissler, Olds & Lowe, P.C.

(57) ABSTRACT

A remote control method comprises: providing a receiving device electrically connected with a display device; the receiving device establishing wireless communication connections respectively with a mobile internet device and a computer; a user inputting a control instruction to the mobile internet device to transmit the control instruction to the receiving device therefrom; the receiving device forwarding the control instruction to the computer; and the computer responding to the control instruction and transmitting a screen frame to the receiving device for the display device to output the screen frame. The remote control method may simplify the operating procedures for switching computers and enhance the communication quality between the mobile internet device and the computer.

26 Claims, 6 Drawing Sheets

REMOTE CONTROL METHOD, AND SYSTEM, RECEIVING DEVICE, MOBILE INTERNET DEVICE AND RECORDING MEDIUM FOR IMPLEMENTING THE SAME

BACKGROUND OF THE INVENTION

1. Field of the Invention

The present invention relates to a remote control method, and more particularly to a remote control method for a mobile internet device to control a remote computer through a wireless area network.

2. Description of the Prior Art

A prior art remote control method requires a user to use a physical keyboard or mouse to operate a remote computer. However, the wireless keyboard or mouse not only increases the expense of the user but also consumes space. Besides, it may not be as convenient to operate the wireless keyboard or mouse in some environment, such as on a couch in a living room.

Figure 1:
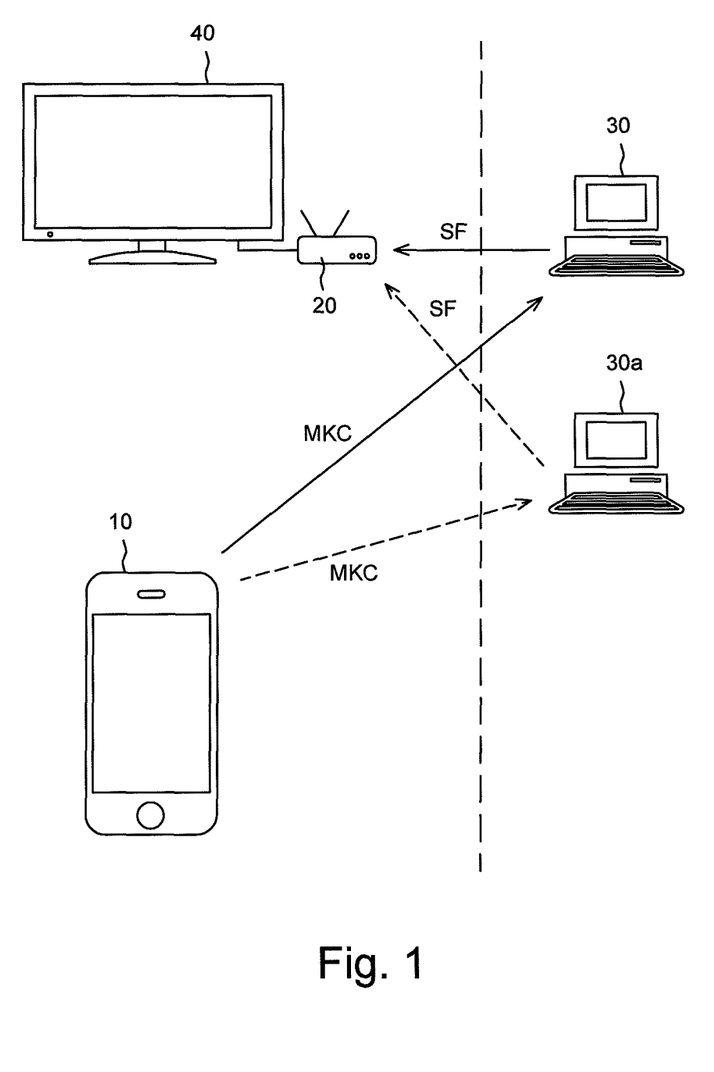
FIG. 1 is a schematic diagram illustrating a prior art remote control system.

During the recent years, mobile internet devices (MID) such as smart phones, tablet PCs and the like have gained widespread popularity rapidly. Another prior art remote control method had also been developed. Referring to FIG. 1, a mobile internet device 10 may be capable of simulating a mouse or keyboard, and a user may then input to the mobile internet device 10 a mouse/keyboard instruction MKC, which is then transmitted to a remote computer 30 through a wireless communication interface on the mobile internet device 10. A screen frame SF of the computer 30 may be wirelessly transmitted to a receiving device 20 and the receiving device 20 sends the screen frame SF to a display device 40 for display. In such way, the user located in a living room may then operate the computer 30 in a home office or bedroom and view the results of the operation on the display device 40 (such as a TV). However, such remote control method has the following disadvantages: 1) since the mobile internet device 10 and the computer 30 are located in different rooms, there exists obstacles such as walls which may cause inferior connection quality; 2) in order to accommodate mobile internet devices 10 of different platforms, software applications corresponding to the platforms would need to be respectively installed on the computer 30; 3) if the user intends to operate another computer 30a, the user must disconnect the mobile internet device 10 and the receiving device 20 from the computer 30, and re-establish a connection with the computer 30a, a drawback in convenience of operation.

In summary, it is highly desirable the remote control process being simplified so as to facilitate operations of a user.

SUMMARY OF THE INVENTION

The present invention is directed to a remote control method, a receiving device, mobile internet device and remote control system for implementing the same, and a recording medium encoded with a computer program implementing the same. The remote control method involves having the mobile internet device establish a wireless communication connection with the receiving device, and using the receiving device to forward a control instruction input by a user and to receive a screen frame transmitted from the remote computer, thereby enhancing communication quality between the mobile internet device and the computer and simplifying the operating procedures for switching computers.

According to a first embodiment, a remote control system comprises a mobile internet device and a receiving device. The mobile internet device comprises a user interface and a first wireless communication interface. The user interface is for a user to input a control instruction therethrough, wherein the user interface simulates at least one of a mouse, a touchpad and a keyboard. The first wireless communication interface abides by IEEE 802.11 communication standard series, and is for transmitting the control instruction. The receiving device comprises a second wireless communication interface, a video interface and a video processing module. The second wireless communication interface abides by IEEE 802.11 communication standard series and directly establishes one wireless communication connection with the mobile internet device and another wireless communication connection with a computer so that the mobile internet device is indirectly connected with the computer via the receiving device. The second wireless communication interface is for receiving a screen frame from the computer and forwarding the control instruction input from the mobile internet device to the computer. The video interface is for electrically connecting with a display device. The video processing module electrically connects with the second wireless communication interface and the video interface, and is for decoding the screen frame without passing through the mobile internet device and outputting the decoded screen frame to the display device for display, wherein the receiving device is directly connected with the mobile internet device, the computer and the display device at the same time during operating.

According to a second embodiment, a receiving device working in coordination with a mobile internet device to form a remote control system is provided. The receiving device comprises a wireless communication interface, a video interface and a video processing module. The wireless communication interface abides by IEEE 802.11 communication standard series and directly establishes one wireless communication connection with the mobile internet device and another wireless communication connection with a computer so that the mobile internet device is indirectly connected with the computer via the receiving device. The wireless communication interface is for receiving a screen frame from the computer and forwarding a control instruction input from a user interface on the mobile internet device to the computer. The video interface is for electrically connecting with a display device. The video processing module electrically connects with the wireless communication interface and the video interface, and is for decoding the screen frame without passing through the mobile internet device and outputting the decoded screen frame to the display device for display, wherein the receiving device is directly connected with the mobile internet device, the computer and the display device at the same time during operating.

According to a third embodiment, a mobile internet device working in coordination with the aforementioned receiving device to form a remote control system is provided. The mobile internet device comprises a user interface and a wireless communication interface. The user interface is for a user to input a control instruction therethrough wherein the user interface simulates at least one of a mouse, a touchpad and a keyboard. The wireless communication interface abides by IEEE 802.11 communication standard series. The wireless communication interface is for establishing the wireless communication with the receiving device to transmit the control instruction to the receiving device.

According to a fourth embodiment, a non-transitory computer readable medium encoded with a receiving end remote control computer program is provided. The receiving end remote control computer program is loadable on a receiving device, for the receiving device to form a remote control system with a mobile internet device. The receiving end remote control computer program comprises: activating a wireless communication interface of the receiving device and directly establishing one wireless communication connection with the mobile internet device and another wireless communication connection with a computer so that the mobile internet device is indirectly connected with the computer via the receiving device; receiving the control instruction transmitted from the mobile internet device, and forwarding the control instruction to the computer; and receiving a screen frame transmitted from the computer without passing through the mobile internet device, and displaying the screen frame on a display device, wherein the receiving device is directly connected with the mobile internet device, the computer and the display device at the same time during operating.

According to a fifth embodiment, a non-transitory computer readable medium encoded with an input end remote control computer program is provided. The input end remote control computer program is loadable on a mobile internet device, for the mobile internet device to form a remote control system with a foregoing receiving device. The input end remote control computer program comprises: activating a wireless communication interface of the mobile internet device and establishing a wireless communication connection with the receiving device, wherein the wireless communication interface abides by IEEE 802.11 standard series; activating a user interface for a user to input a control instruction therethrough, wherein the user interface simulates at least one of a mouse, a touchpad and a keyboard; and transmitting the control instruction input from the mobile internet device to the receiving device so as for the receiving device to forward the control instruction to the computer.

According to a sixth embodiment, a remote control method comprises: providing a receiving device electrically connected with a display device; the receiving device directly establishing one wireless communication connection with a mobile internet device and another wireless communication connection with a computer so that the mobile internet device is indirectly connected with the computer via the receiving device, wherein the receiving device abides by IEEE 802.11 standard series; a user inputting a control instruction to the mobile internet device to transmit the control instruction to the receiving device therefrom; the receiving device forwarding the control instruction input from the mobile internet device to the computer; and the computer responding to the control instruction and transmitting a screen frame to the receiving device without passing through the mobile internet device for the display device to output the screen frame, wherein the receiving device is directly connected with the mobile internet device, the computer and the display device at the same time during operating.

The objective, technologies, features and advantages of the present invention will become more apparent from the following description in conjunction with the accompanying drawings, wherein certain embodiments of the present invention are set forth by way of illustration and examples.

DESCRIPTION OF THE PREFERRED EMBODIMENT

Figure 2:
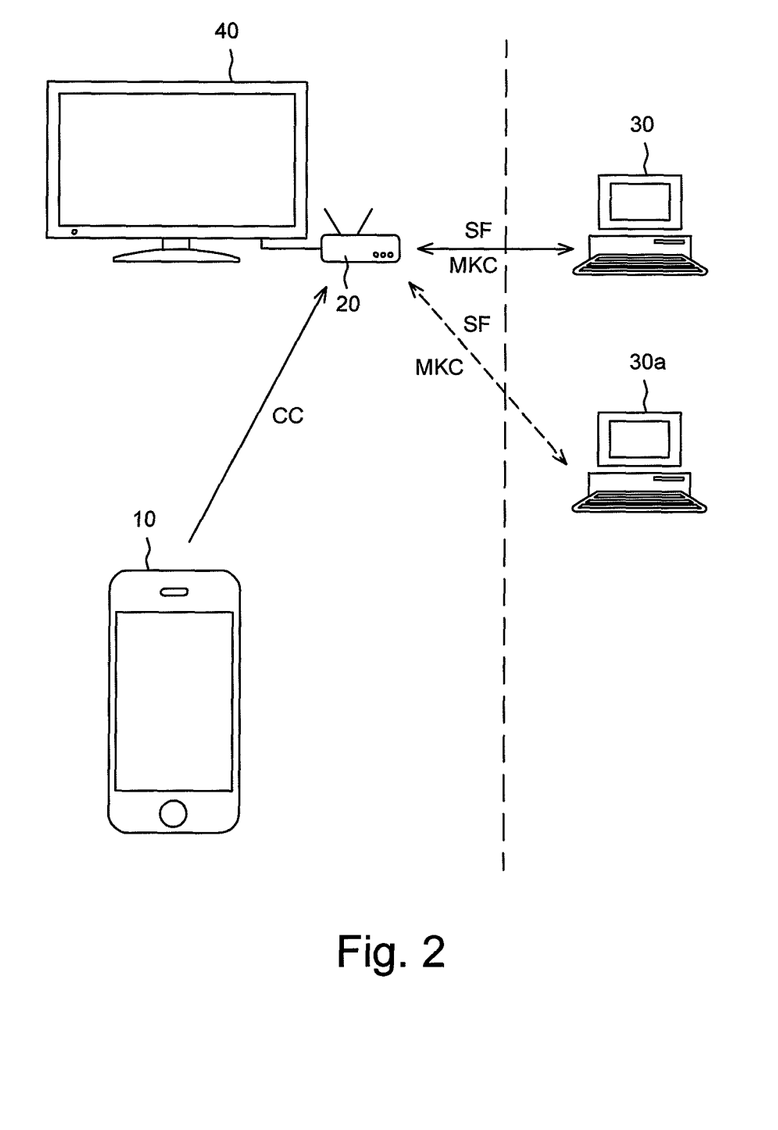
FIG. 2 is a schematic diagram illustrating a remote control system according to an embodiment of the present invention.
Figure 3:
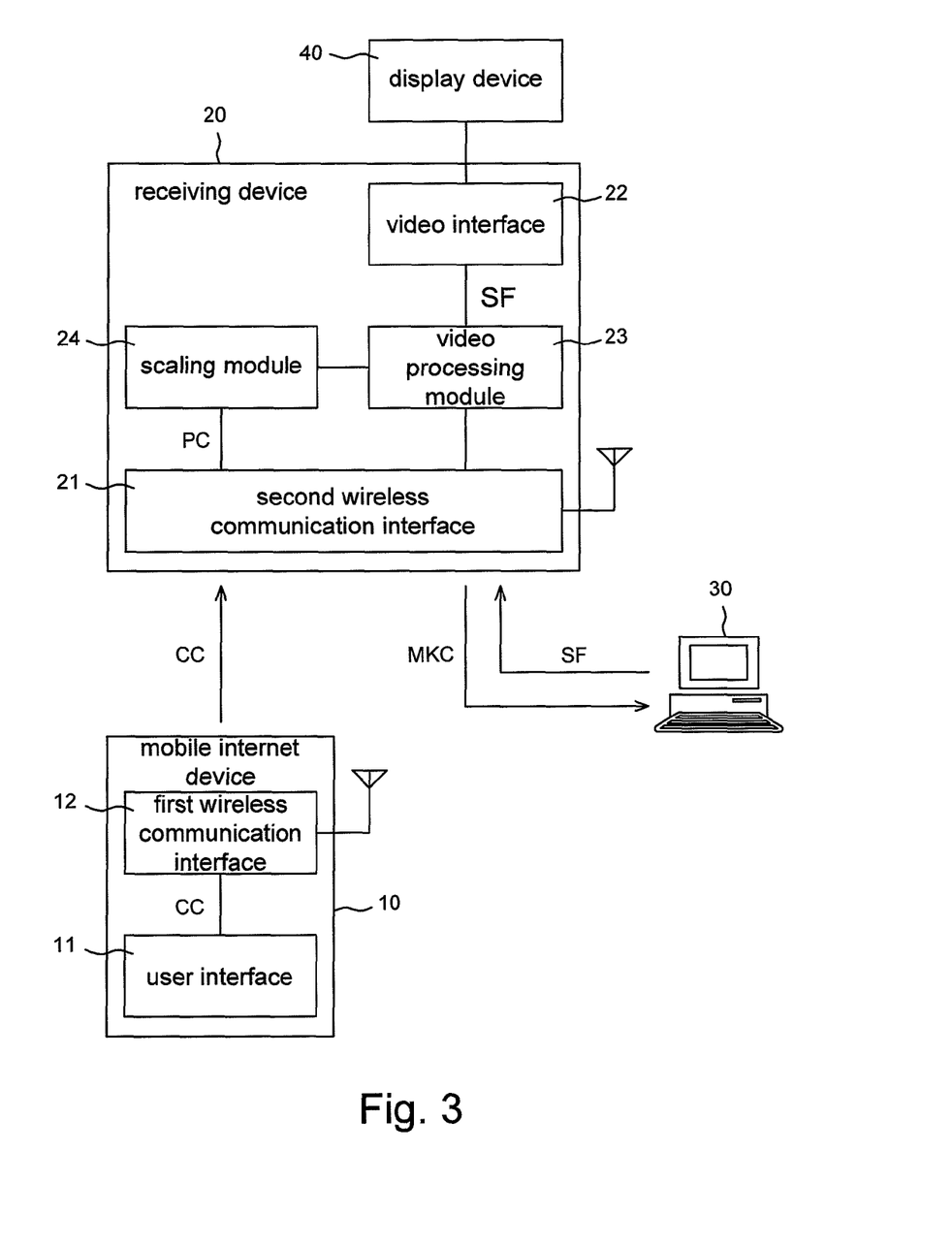
FIG. 3 is a block diagram illustrating a remote control system according to an embodiment of the present invention.

Referring to FIG. 2 and FIG. 3, the remote control system according to an embodiment comprises a mobile internet device 10 and a receiving device 20. The mobile internet device 10 comprises a user interface 11 and a first wireless communication interface 12. The user interface 11 is for a user to input a control instruction CC therethrough. For example, the user interface 11 may be a touch panel, an accelerometer, physical keys or a combination thereof. The first wireless communication interface 12 abides by IEEE 802.11 standard series and is for converting the control instruction CC into wireless network packets to be transmitted to the receiving device 20. According to an embodiment, the mobile internet device 10 may be a smart phone, a tablet PC or a Personal Digital Assistant. The mobile internet device 10 may be regarded virtually as a mouse, touchpad or keyboard for the user to input the control instruction CC such as a mouse/keyboard instruction MKC, which is then transmitted from the mobile internet device 10 to the receiving device 20.

The receiving device 20 comprises a second wireless communication interface 21, a video interface 22 and a video processing module 23. The second wireless communication interface 21 also abides by IEEE 802.11 standard series. Through the second wireless communication interface 21, the receiving device 20 establishes a wireless communication connection with the mobile internet device 10 to receive the control instruction CC transmitted from the mobile internet device 10. Besides, the receiving device 20 also establishes a wireless communication connection with the computer 30 with the second wireless communication interface 21. In this way, the receiving device 20 could forward the mouse/keyboard instruction MKC in the control instruction CC to the computer 30, and receive a screen frame SF transmitted from the computer 30, which includes the corresponding screen frame SF generated in response to the mouse/keyboard instruction MKC. The video interface 22 is for connecting electrically with a display device 40. For example, the display device 40 may be a TV, a projector or the like. The video processing module 23 is electrically connected with the second wireless communication interface 21 and the video interface 22. The video processing module 23 could decode the received screen frame SF of the second wireless communication interface 21, and output to the display device 40 for display. According to an embodiment, the receiving device 20 may be built-in to the display device 40.

The screen frame SF transmitted from the computer 30 to the receiving device 20 may not be displayed on the display device 40 with the desired effect. For example, a font or icons displayed may be too small for the user to read the text or click on the icon. According to an embodiment, the user interface 11 may be a multi-touch panel. In this way, the user may input the control instruction CC such as a pinch instruction PC using a hand gesture to locally magnify and shrink the screen frame SF transmitted from the computer 30. According to the embodiment, the receiving device 20 further comprises a scaling module 24 electrically connected with the second wireless communication interface 21 and the video processing module 23. The scaling module 24 could adjust a scaling factor of the displayed screen frame SF on the display device 40 and a moving distance of a mouse pointer according to the pinch instruction PC, thereby allowing the user to read the screen frame SF more easily and operate the mouse pointer more smoothly. For example, the user may touch the multi-touch panel with two fingers and move the two fingers towards opposite directions to represent locally magnifying the screen frame SF. At this instance, the receiving device 20 would receive the control instruction CC including the pinch instruction PC, and then the scaling module 24 would request the video processing module 23 to locally magnify a specific area of the screen frame SF, and to shrink moving distances of the mouse pointer moving operations thereafter. It is noted that the receiving device 20 may not have to forward the pinch instruction PC input through the mobile internet device 10 to the computer 30. Hence, a display device on the end of the computer 30 needs not to correspondingly change in response to the pinch instruction PC, but a moving distance (i.e. the sensitivity) of the mouse pointer would be correspondingly adapted according to a magnification or shrinkage of the displayed screen frame SF on the display device 40. For instance, locally magnifying the displayed screen frame SF on the display device 40 by the user means a decrease of a moving range of the mouse pointer on the end of the computer 30. On the other hand, locally shrinking the displayed screen frame SF on the display device 40 means an increase of the moving range of the mouse pointer on the end of the computer 30.

According to an embodiment, the user may first have the receiving device 20 establish a wireless communication connection with the computer 30, and wait for the mobile internet device 10 to establish a wireless communication connection with the receiving device 20 so as to use the mobile internet device 10 to operate the remote computer 30. Alternatively, the receiving device 20 could scan for the computers 30, 30a capable of establishing a wireless communication connection with the receiving device 20 by itself, and output a list of the computers 30, 30a capable of establishing the connection to the display device 40 for display. After the mobile internet device 10 establishes the wireless communication connection with the mobile internet device 10, the user may then select one of the computers 30, 30a on the list displayed on the display device 40 to which remote control is performed.

According to the aforementioned configuration, the user can easily switch the computer to be operated. For example, referring to FIG. 2, the user only has to disconnect the receiving device 20 from the computer 30 and then have the receiving device 20 establish a wireless communication connection with another computer 30a to operate the remote computer 30a directly with the mobile internet device 10. In other words, the mobile internet device 10 does not need to disconnect from the receiving device 20. Besides, only the software application corresponding to the receiving device 20 needs to be installed on the computer 30 for the mobile internet devices 10 of different platforms can perform remote control to the computer 30. According to an embodiment, the computer 30 may be a PC (personal computer), a server, or even a tablet PC or a smart phone. Also, the mobile internet device 10 and the receiving device 20 are often within the range of the line of sight of each other, and therefore the communication quality is better.

Figure 4:
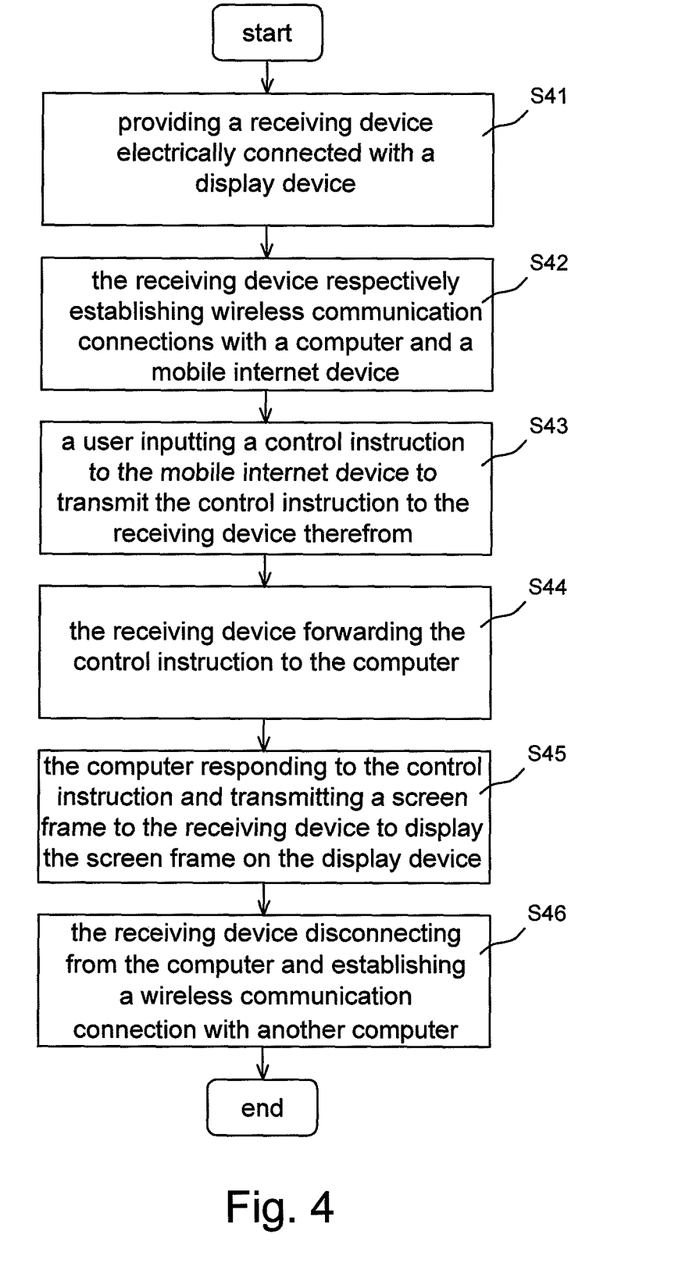
FIG. 4 is a flow chart illustrating a remote control method according to an embodiment of the present invention.

Referring to FIG. 2 and FIG. 4, there are illustrated a remote control method according to an embodiment. First, a receiving device 20 is provided and the receiving device 20 is electrically connected with a display device 40 (S41). Then, the receiving device 20 respectively establishes wireless communication connections with a mobile internet device 10 and a computer 30, wherein the receiving device 20 abides by IEEE 802.11 communication standard series (S42). The user inputs a control instruction CC through the mobile internet device 10 and the mobile internet device 10 transmits the control instruction CC to the receiving device 20 (S43). The receiving device 20 forwards the received control instruction CC to the computer 30 (S44). According to an embodiment, the control instruction CC could include a mouse/keyboard instruction MKC and/or a pinch instruction PC. In the step S44, the receiving device 20 only transmits the mouse/keyboard instruction MKC to the computer 30. Finally, the computer 30 responds to the transmitted mouse/keyboard instruction MKC to the receiving device 20 and transmits a screen frame SF to the receiving device 20. The receiving device 20 then outputs the received screen frame SF to the display device 40 for display (S45). It is understood that the computer 30 may continuously send screen frames SF to the receiving device 20 so that the user may have a real-time operating experience, and the computer 30 is not limited to transmit the screen frame SF upon receiving the mouse/keyboard instruction MKC.

According to an embodiment, the receiving device 20 disconnects from the computer 30 and establishes a wireless communication connection with another computer 30a for remote control to be switched to the computer 30a (S46). Besides, when the receiving device 20 receives the control instruction CC including the pinch instruction PC, the receiving device 20 could adjust a scaling factor of the displayed screen frame SF on the display device 40 and a moving distance of the mouse pointer according to the pinch instruction PC. Alternatively, the receiving device 20 may scan for the computers 30, 30a capable of establishing a wireless communication connection with the receiving device 20 itself and output the list of the computers to the display device 40 for display, allowing the user to select one of the computers 30, 30a on the list to which remote control is performed. The detail description of the aforementioned steps has been provided above and is omitted here.

Figure 5:
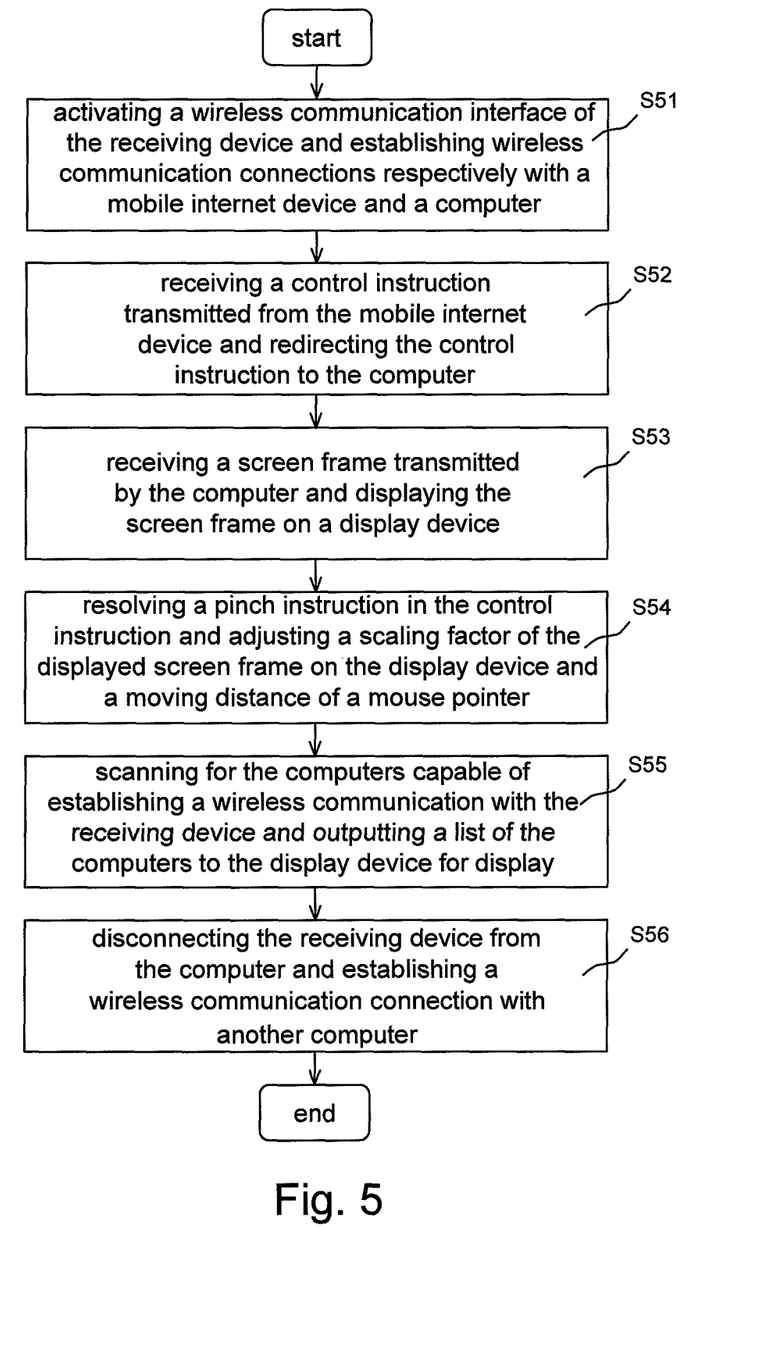
FIG. 5 is a flow chart illustrating steps of a receiving end remote control program according to an embodiment of the present invention.

According to an embodiment, a computer readable medium is encoded with a receiving end remote control computer program. After the receiving end remote control computer program is loaded on a receiving device, the receiving device can form the aforementioned remote control system with a mobile internet device. Referring to FIG. 2 and FIG. 5, the receiving end remote control computer program comprises the following steps: activating a wireless communication interface of the receiving device 20 and establishing wireless communication connections respectively with the mobile internet device 10 and a computer 30 (S51); receiving a control instruction CC transmitted from the mobile internet device 10, and forwarding the control instruction CC to the computer 30 (S52); and receiving a screen frame SF transmitted from the computer 30 and displaying the screen frame SF on a display device 40 (S53).

According to an embodiment, the receiving end remote control computer program optionally includes the following steps: resolving a pinch instruction PC in the control instruction CC and adjusting a scaling factor of the displayed screen frame SF on the display device 40 and a moving distance of a mouse pointer according to the pinch instruction PC (S54); scanning for the computers 30, 30a capable of establishing a wireless communication connection with the receiving device 20, and outputting a list of the computers 30, 30a to the display device 40 for display, allowing the user to select one of the computers 30, 30a on the list to which remote control is performed (S55); and disconnecting the receiving device 20 from the computer 30 and establishing a wireless communication connection with another computer 30a for remote control to be switched to the computer 30a. The detail description of the aforementioned steps has been provided above and is omitted here.

Figure 6:
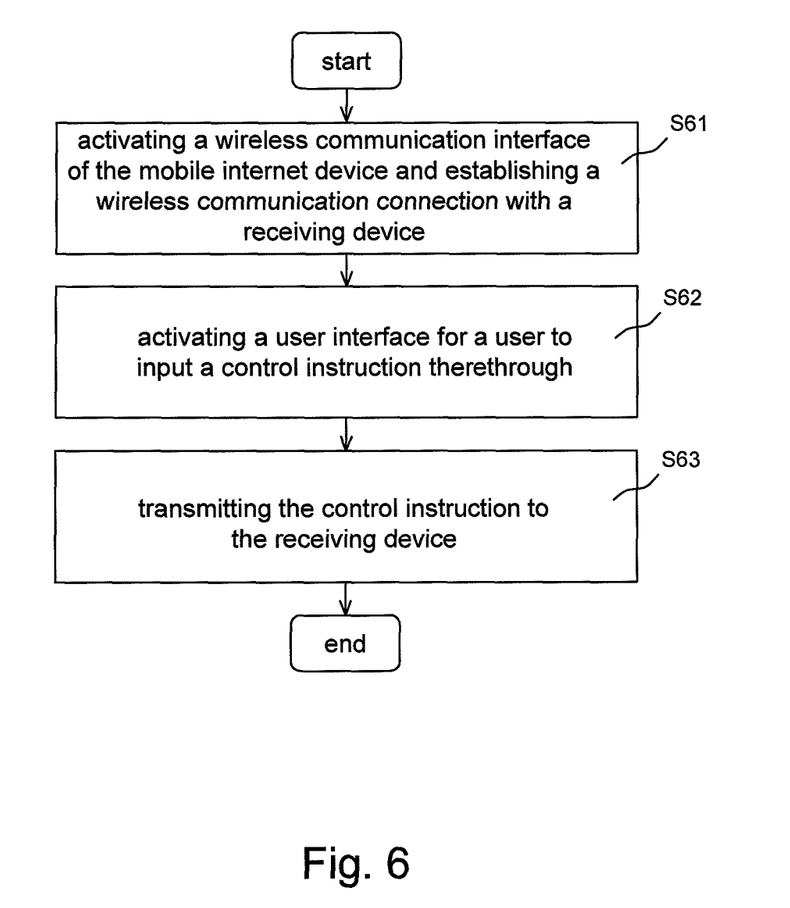
FIG. 6 is a flow chart illustrating steps of an input end remote control program according to an embodiment of the present invention.

According to an embodiment, a computer readable medium is encoded with an input end remote control computer program. The input end remote control computer program is loadable on a mobile internet device to form the aforementioned remote control system with a receiving device. Referring to FIG. 3 and FIG. 6, the input end remote control computer program comprises the following steps: activating a wireless communication interface 11 of the mobile internet device 10 and establishing a wireless communication connection with the receiving device 20, wherein the wireless communication interface abides by IEEE 802.11 standard series (S61); activating a user interface 12 for a user to input a control instruction CC therethrough (S62); and transmitting the control instruction CC to the receiving device 20 so as for the receiving device 20 to forward the control instruction CC to the computer 30 (S63). The detail description of the aforementioned steps has been provided above and is omitted here.

To summarize the foregoing description, the remote control method according to the present invention involves having a mobile internet device establish a wireless communication connection with a receiving device, and using the receiving device to forward a control instruction input by a user and receive a screen frame transmitted from a remote computer, thereby enhancing the communication quality between the mobile internet device and the computer and simplifying the operating procedures for switching computers, as well as simplifying software installed on the remote computer.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A remote control system, comprising:
a mobile internet device comprising:
a user interface for a user to input a control instruction therethrough, wherein the user interface simulates at least one of a mouse, a touchpad and a keyboard; and
a first wireless communication interface which abides by IEEE 802.11 communication standard series, and is for transmitting the control instruction; and
a receiving device comprising:
a second wireless communication interface which abides by IEEE 802.11 communication standard series and directly establishes one wireless communication connection with the mobile internet device and another wireless communication connection with a computer so that the mobile internet device is indirectly connected with the computer via the receiving device, and is for receiving a screen frame from the computer and forwarding the control instruction input from the mobile internet device to the computer;
a video interface for electrically connecting with a display device; and
a video processing module which electrically connects with the second wireless communication interface and the video interface, and is for decoding the screen frame without passing through the mobile internet device and outputting the decoded screen frame to the display device for display, wherein the receiving device is directly connected with the mobile internet device, the computer and the display device at the same time during operating.

2. The remote control system according to claim 1, wherein the control instruction comprises a pinch instruction for locally magnifying and shrinking the screen frame.

3. The remote control system according to claim 2, wherein the receiving device further comprises a scaling module which electrically connects with the second wireless communication interface and the video processing module, and is for adjusting a scaling factor of the displayed screen frame on the display device and a moving distance of a mouse pointer.

4. The remote control system according to claim 1, wherein the receiving device scans for the computers capable of establishing the wireless communication connection with the receiving device, and outputs a list of the computers to the display device for display, allowing the user to select one of the computers on the list to which remote control is performed.

5. The remote control system according to claim 1, wherein the receiving device is built-in to the display device.

6. The remote control system according to claim 1, wherein the user interface comprises a touch panel, an accelerometer, physical keys or a combination thereof.

7. The remote control system according to claim 1, wherein the mobile internet device comprises a smart phone, a tablet PC or a Personal Digital Assistant.

8. A receiving device working in coordination with a mobile internet device to form a remote control system, the receiving device comprising:
a wireless communication interface which abides by IEEE 802.11 communication standard series and directly establishes one wireless communication connection with the mobile internet device and another wireless communication connection with a computer so that the mobile internet device is indirectly connected with the computer via the receiving device, and is for receiving a screen frame from the computer and forwarding a control instruction input from a user interface on the mobile internet device to the computer;
a video interface for electrically connecting with a display device; and
a video processing module which electrically connects with the wireless communication interface and the video interface, and is for decoding the screen frame without passing through the mobile internet device and outputting the decoded screen frame to the display device for display, wherein the receiving device is directly connected with the mobile internet device, the computer and the display device at the same time during operating.

9. The receiving device according to claim 8, wherein the control instruction comprises a pinch instruction for locally magnifying and shrinking the screen frame.

10. The receiving device according to claim 9, further comprises:
a scaling module which electrically connects with the wireless communication interface and the video processing module, and is for adjusting a scaling factor of the displayed screen frame on the display device and a moving distance of a mouse pointer.

11. The receiving device according to claim 8, wherein the wireless communication interface scans for the computers capable of establishing the wireless communication connection with the receiving device, and outputs a list of the computers to the display device for display, allowing the user to select one of the computers on the list to which remote control is performed.

12. The receiving device according to claim 8, wherein the receiving device is built-in to the display device.

13. A mobile internet device working in coordination with a receiving device to form a remote control system, the receiving device directly establishing one wireless communication connection with the mobile internet device and another wireless communication connection with a computer so that the mobile internet device is indirectly connected with the computer via the receiving device and the receiving device receives a screen frame from the computer and forward a control instruction input from the mobile internet device to the computer, the mobile internet device comprising:
 a user interface for a user to input a control instruction therethrough, wherein the user interface simulates at least one of a mouse, a touchpad and a keyboard; and
 a wireless communication interface which abides by IEEE 802.11 communication standard series, and is for establishing the wireless communication with the receiving device to transmit the control instruction to the receiving device.

14. The mobile internet device according to claim 13, wherein the control instruction comprises a pinch instruction for locally magnifying and shrinking the screen frame.

15. The mobile internet device according to claim 13, wherein the user interface comprises a touch panel, an accelerometer, physical keys or a combination thereof.

16. The mobile internet device according to claim 13, comprising a smart phone, a tablet PC or a Personal Digital Assistant.

17. A non-transitory computer readable medium encoded with a receiving end remote control computer program, the receiving end remote control computer program being loadable on a receiving device, for the receiving device to form a remote control system with a mobile internet device, wherein the mobile internet device is for a user to input a control instruction therefrom, and the receiving end remote control computer program comprises:
 activating a wireless communication interface of the receiving device and directly establishing one wireless communication connection with the mobile interne device and another wireless communication connection with a computer so that the mobile internet device is indirectly connected with the computer via the receiving device;
 receiving the control instruction transmitted from the mobile internet device, and forwarding the control instruction to the computer; and
 receiving a screen frame transmitted from the computer without passing through the mobile internet device, and displaying the screen frame on a display device, wherein the receiving device is directly connected with the mobile internet device, the computer and the display device at the same time during operating.

18. The non-transitory computer readable medium according to claim 17, wherein the control instruction comprises a pinch instruction for locally magnifying and shrinking the screen frame, and the receiving end remote control computer program further comprises resolving the pinch instruction and adjusting a scaling factor of the displayed screen frame on the display device and a moving distance of a mouse pointer according to the pinch instruction.

19. The non-transitory computer readable medium according to claim 17, wherein the receiving end remote control computer program further comprises scanning for the computers capable of establishing the wireless communication connection with the receiving device, and outputting a list of the computers to the display device for display, allowing the user to select one of the computers on the list to which remote control is performed.

20. The non-transitory computer readable medium according to claim 17, wherein the receiving end remote control program further comprises disconnecting from the computer and establishing the wireless communication connection with another computer while the receiving device connects continuously with the mobile internet device.

21. A non-transitory computer readable medium encoded with an input end remote control computer program, the input end remote control computer program being loadable on a mobile internet device, for the mobile internet device to form a remote control system with a receiving device, wherein the receiving device directly establishes one wireless communication connection with the mobile internet device and another wireless communication connection with a computer so that the mobile internet device is indirectly connected with the computer via the receiving device, and is electrically connected with a display device to display a screen frame transmitted from the computer, and the input end remote control computer program comprises:
 activating a wireless communication interface of the mobile internet device and establishing the wireless communication connection with the receiving device, wherein the wireless communication interface abides by IEEE 802.11 standard series;
 activating a user interface for a user to input a control instruction therethrough, wherein the user interface simulates at least one of a mouse, a touchpad and a keyboard; and
 transmitting the control instruction to the receiving device so as for the receiving device to forward the control instruction input from the mobile internet device to the computer.

22. A remote control method, comprising:
 providing a receiving device electrically connected with a display device;
 the receiving device directly establishing one wireless communication connection with a mobile internet device and another wireless communication connection with a computer so that the mobile internet device is indirectly connected with the computer via the receiving device, wherein the receiving device abides by IEEE 802.11 standard series;
 a user inputting a control instruction to the mobile internet device to transmit the control instruction to the receiving device therefrom;
 the receiving device forwarding the control instruction input from the mobile internet device to the computer; and
 the computer responding to the control instruction and transmitting a screen frame to the receiving device without passing through the mobile internet device for the display device to output the screen frame, wherein the receiving device is directly connected with the mobile internet device, the computer and the display device at the same time during operating.

23. The remote control method according to claim 22, wherein the control instruction comprises a pinch instruction for locally magnifying and shrinking the screen frame.

24. The remote control method according to claim 23, wherein the receiving device adjusts a scaling factor of the displayed screen frame on the display device and a moving distance of a mouse pointer according to the pinch instruction.

25. The remote control method according to claim 22, further comprising:

the receiving device scanning for the computers capable of establishing the wireless communication connection with the receiving device, and outputting a list of the computers to the display device for display, allowing the user to select one of the computers on the list to which remote control is performed.

26. The remote control method according to claim 22, further comprising:

the receiving device disconnecting from the computer and establishing the wireless communication connection with another computer while the receiving device connects continuously with the mobile internet device.

* * * * *